June 19, 1928.
E. E. CLEMENTS
STRIP APPLYING MACHINE
Filed Feb. 11, 1922
1,674,192
5 Sheets-Sheet 1
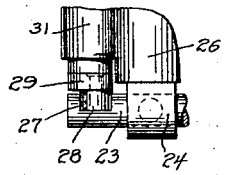
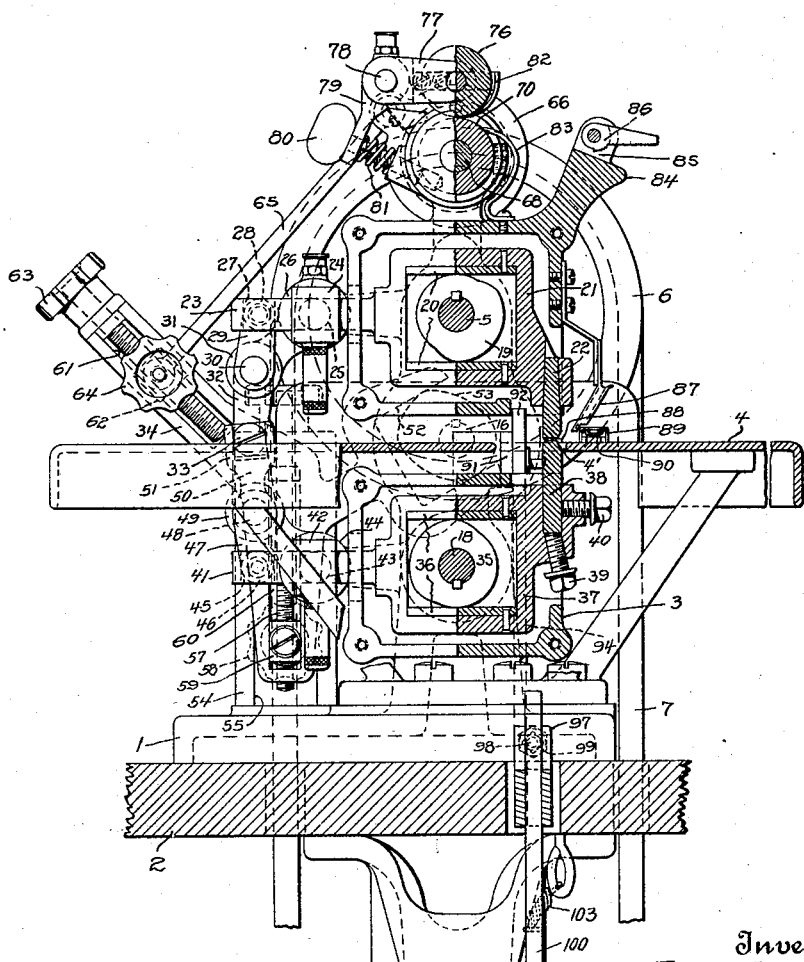
Inventor.
Eugene E. Clements,
By his Attorney.
Ernest Hopkinson

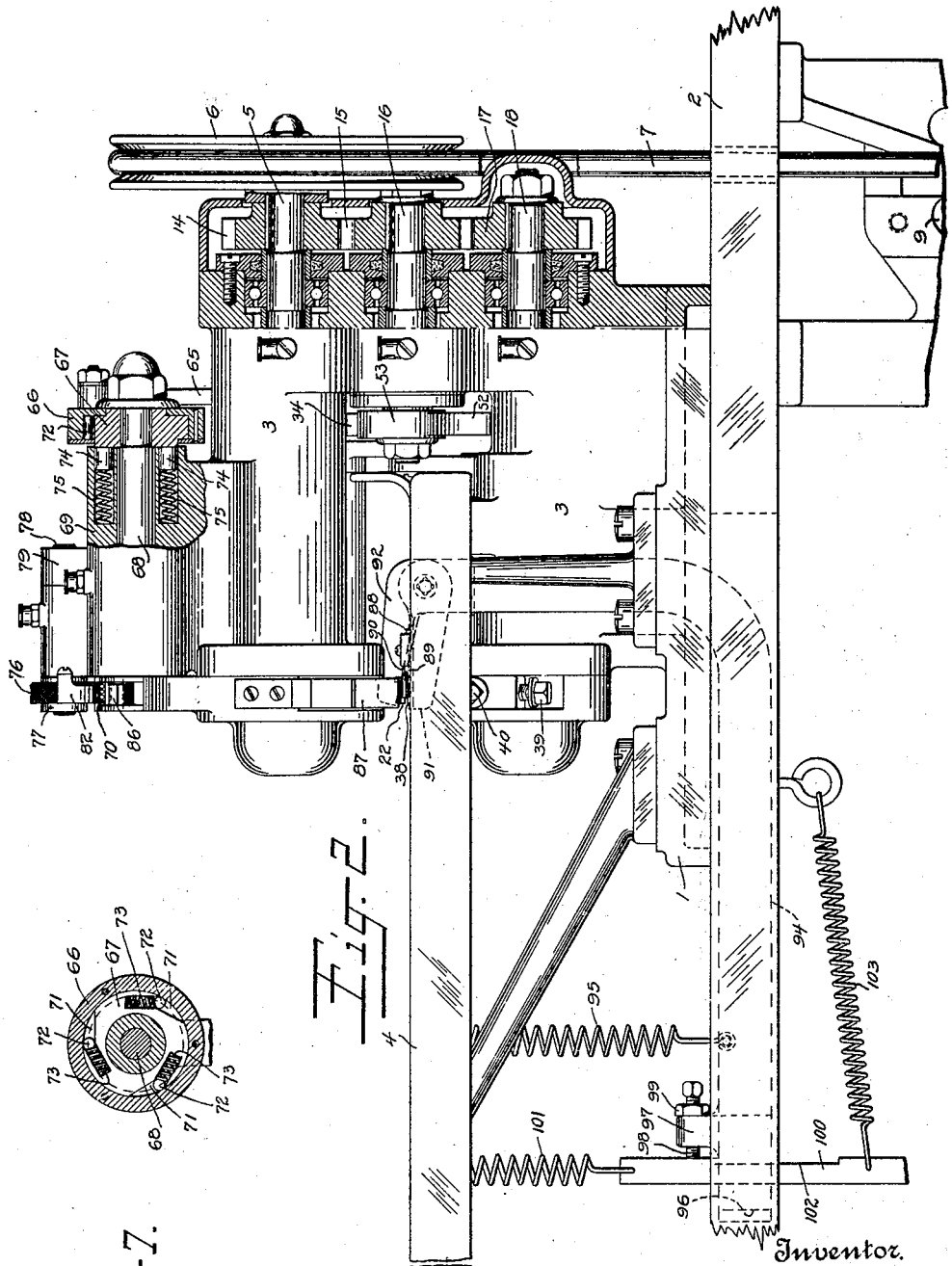

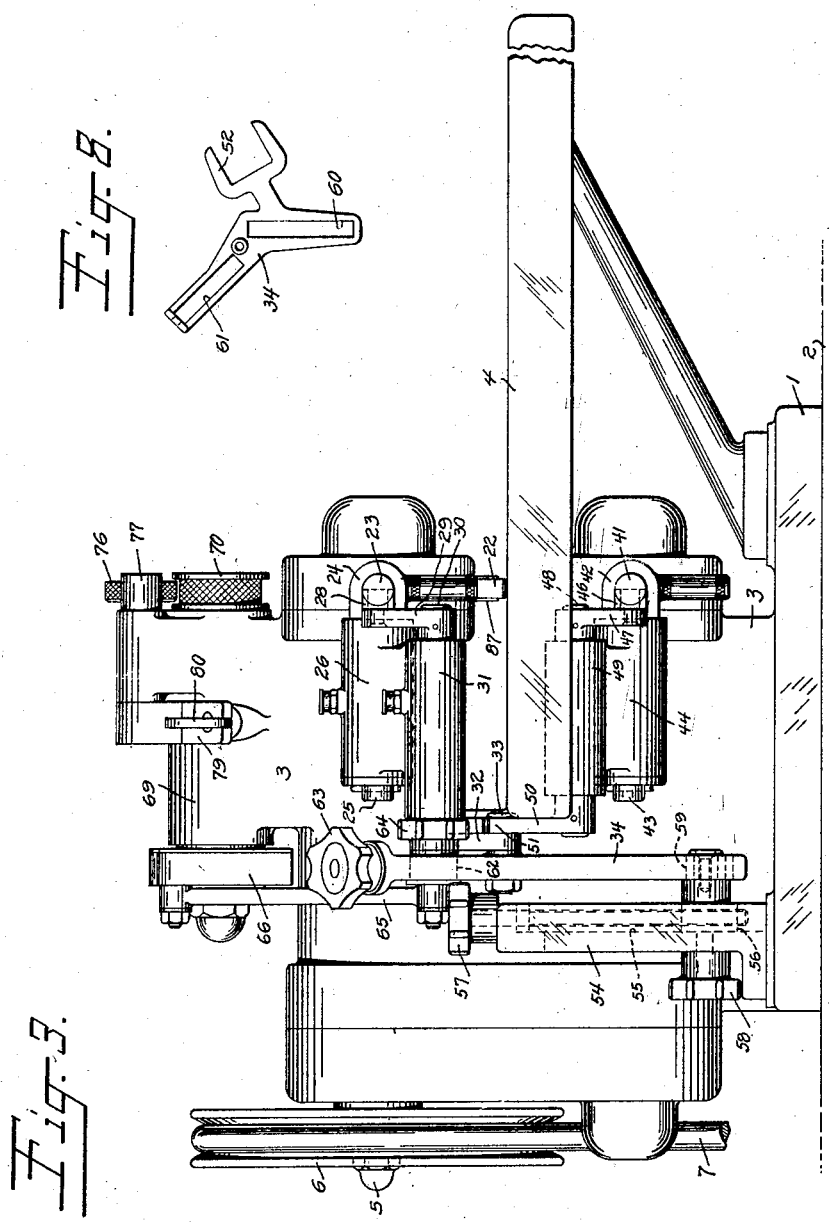

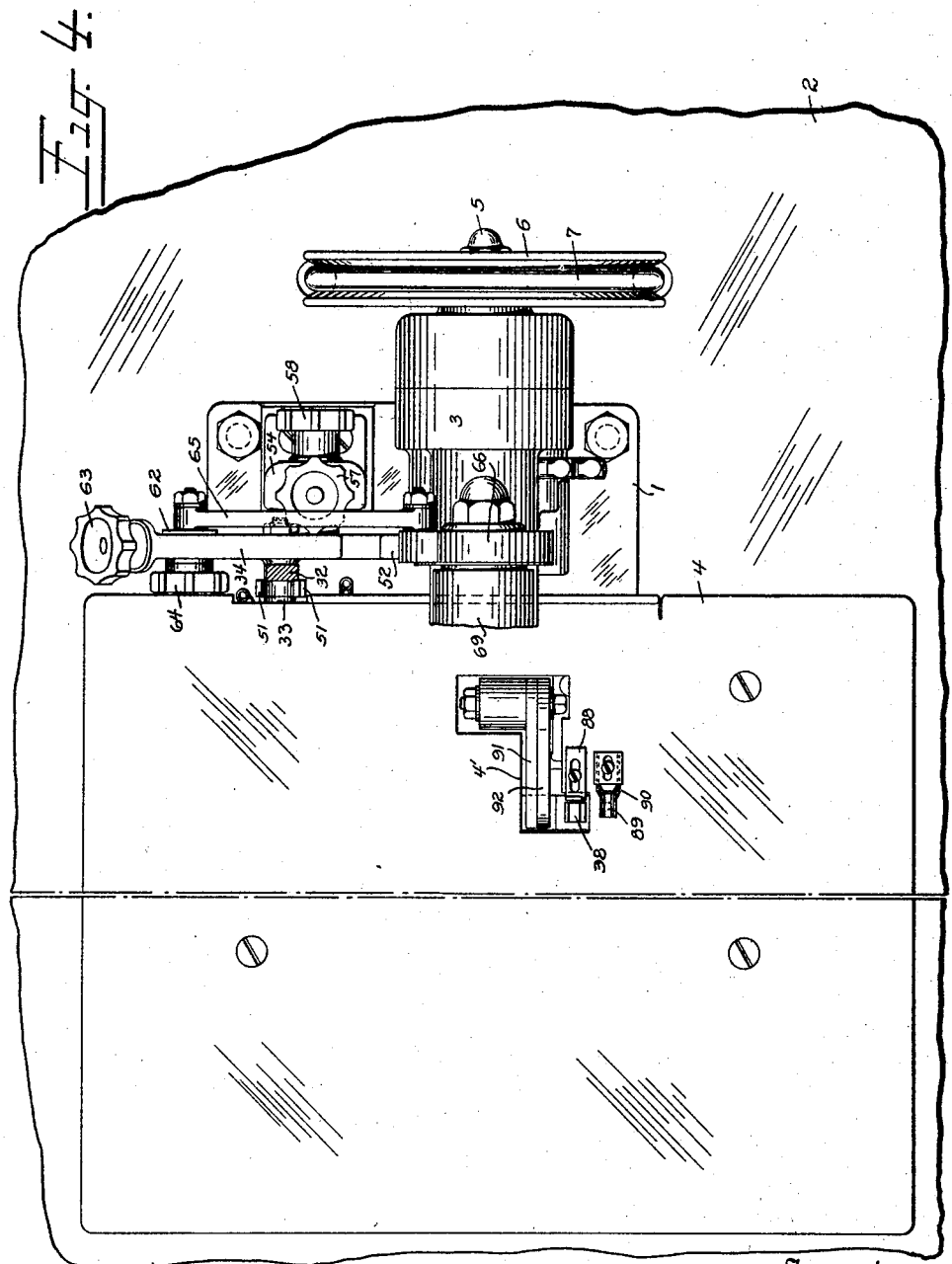

June 19, 1928.
E. E. CLEMENTS
1,674,192
STRIP APPLYING MACHINE
Filed Feb. 11, 1922
5 Sheets-Sheet 5
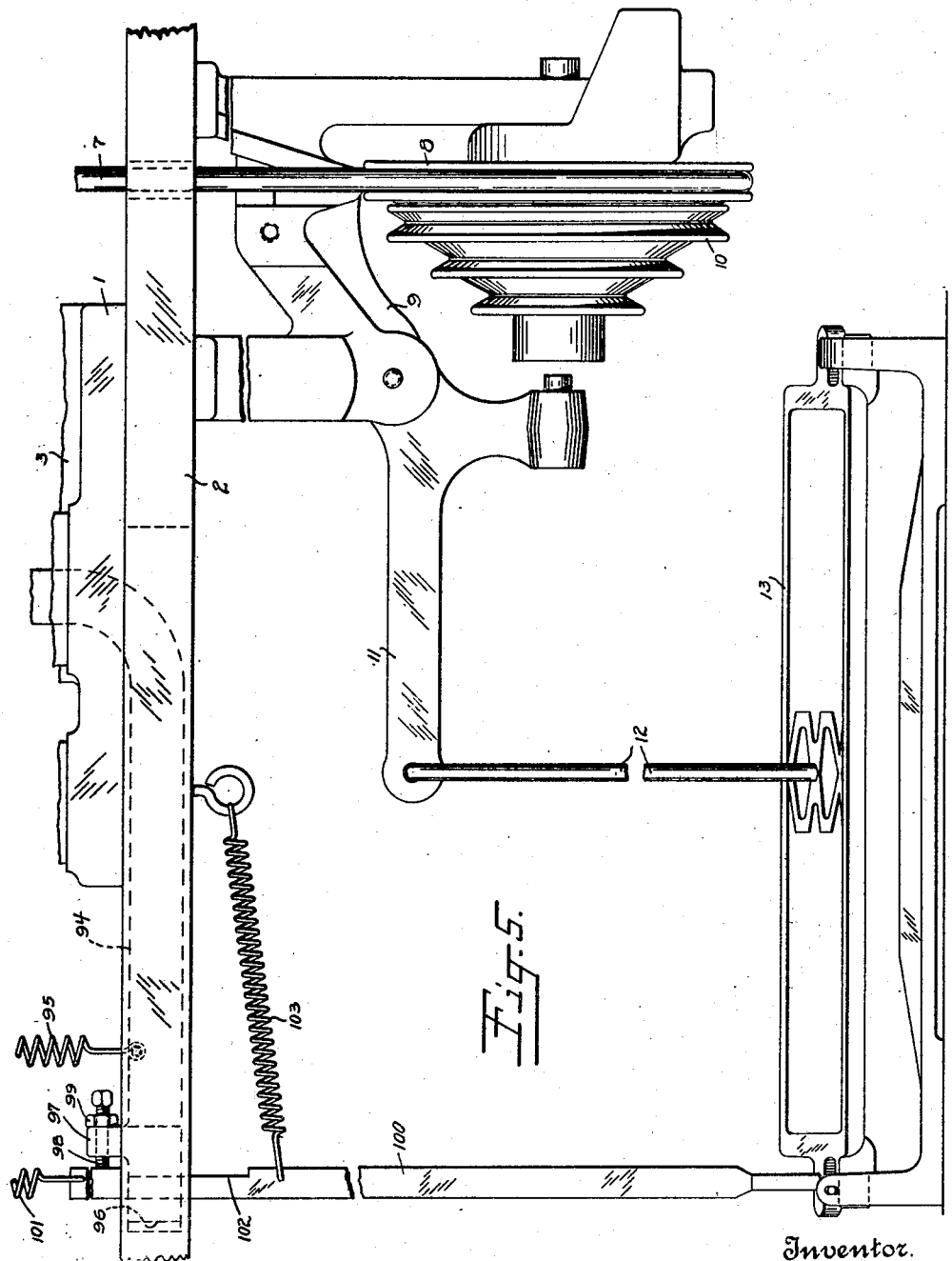
Inventor.
Eugene E. Clements.
By his Attorney.
Ernest Hopkinson Patented June 19, 1928.

1,674,192

UNITED STATES PATENT OFFICE.

EUGENE E. CLEMENTS, OF NEW HAVEN, CONNECTICUT, ASSIGNOR TO L. CANDEE & COMPANY, A CORPORATION OF CONNECTICUT.

STRIP-APPLYING MACHINE.

Application filed February 11, 1922. Serial No. 535,851.

This invention relates to a strip applying machine, more particularly to a machine for adhesively uniting by pressure pieces of rubber or rubberized sheeted material.

In the manufacture of vulcanizable articles built up of superposed layers of rubber and rubberized fabric, such as articles of rubber footwear, a great deal of manual labor is necessary, and in the majority of cases the various parts of the article are built up by superposing them and hand-rolling to compact the parts. This adds greatly to the expense of making the articles and is a more or less laborious operation. The present invention relates to a machine for adhesively uniting by pressure pieces of rubber or rubberized material, and more particularly to a machine for applying a binding to the edge of cashmerette arctic uppers, but it is not, however, limited to this particular use.

An object of my invention is to provide an improved means for adhesively uniting sheet material.

Another object is to provide means for adhesively uniting by pressure successive predetermined portions of rubber or rubberized sheeted material.

Still another object is to provide a machine for applying a binding strip to an arctic upper.

A further object is to provide an improved work guide.

A still further object is to provide an improved strip cutting device.

For a detailed disclosure of the objects and nature of the invention reference is had to the accompanying specification and drawings, in which latter:

Fig. 1 is a side elevation partly in section of the machine;

Fig. 2 is a front elevation with parts in section;

Fig. 3 is a rear elevation;

Fig. 4 is a plan with parts broken away;

Fig. 5 is a front elevation illustrating the mechanism for operating the strip cutter;

Fig. 6 is a detail of the sliding and pivotal mounting of one of the yokes;

Fig. 7 is a sectional view through a one-way clutch for the strip feeding roll; and Fig. 8 is a plan of a detail.

Referring to the drawings the numeral 1 designates the base of the machine which may be suitably mounted on a table 2. Extending upwardly from the base is a frame 3 carrying a work bed 4. Journaled in the upper portion of the frame is a main shaft 5 having at one end a pulley 6 which is driven by the belt 7 from a loose pulley 8, which latter may be connected by a well-known power transmitter or brake and clutch mechanism 9 to the stepped drive pulley 10 actuated from any suitable source of power, (Figs. 2 and 5). The brake and clutch mechanism is connected by an operating arm 11 with a link 12 secured at its other end to a treadle 13.

Mounted on the shaft 5 is a gear 14 meshing with a gear 15 carried by an intermediate shaft 16, the gear 15 in turn meshing with a gear 17 carried on shaft 18. A cam 19 (Fig. 1) is keyed on the shaft 5 and this cam bears against a pair of wear plates 20 secured in the yoke 21, at the forward lower end of which is mounted an anvil 22. At its other end the yoke is provided with a rearwardly extending shank or rod 23 slidably mounted in the head 24 of a pivot pin 25, the latter being mounted in the bearing 26, (Fig. 6). Adjacent the outer end of the shank 23 it is provided with a recess 27 in which is disposed a roller 28 projecting from the upper end of a rock arm 29 carried by the rock shaft 30, which latter is mounted in the bearing 31. A second rock arm 32 projects from the opposite end of shaft 30 and is pivotally secured by the pin 33 to a three-arm rocking lever 34 shown in detail in Fig. 8. A second cam 35 is keyed on the shaft 18 and bears against the wear plates 36 secured in the yoke 37. An anvil 38 coacting with the anvil 22 is adjustably secured in one end of the yoke by means of the adjusting screw 39 and set screw 40. A shank or rod 41 extending from the other end of the yoke is slidably mounted in the head 42 of a pivot pin 43 mounted in the bearing 44. The shank 41 adjacent its end is provided with a recess 45 in which is disposed a roller 46 projecting from the end of a rock arm 47 secured to the shaft 48 mounted in bearing 49. A rock arm 50 is secured to the opposite end of shaft 48 and at its free end is provided with a fork 51 adapted to straddle the pivot pin 33. One of the arms of the rocking lever 34 is forked at 52, which fork is engaged by the cam 53 keyed to shaft 16. Extending upwardly from the base 1 is a bracket 54 (Fig. 3) having a slideway 55 therein in which is mounted a slide block 56. This slide block may be adjusted by the long adjusting screw 57 threaded thereinto, and the block is held in adjusted position by the lock nut 58. The slide block 56 projects outwardly from the bracket 54 and has a smaller slide block 59 pivotally mounted thereon, which block 59 is movable in the slot 60 formed in a second arm of the rocking lever 34.

The third arm of the lever is provided with a slideway 61 in which is disposed a slide block 62, which latter may be adjusted by the long adjusting screw 63 threaded thereinto, and held in adjusted position by the lock nut 64. Pivotally connected to the slide block 62 is a connecting link 65 the other end of which is pivotally connected to the outer member 66 of a one-way clutch (Figs. 1, 2 and 3). This member is rotatably mounted on the inner clutch member 67 which latter is rigidly secured to the shaft 68 mounted in the bearing 69, and secured on the opposite end of the shaft 68 is a flange and knurled feed roll 70. The inner clutch member 67 is provided at its periphery with the inwardly inclined recesses 71 in which are disposed rollers 72 spring pressed by the coil spring 73. Friction brake plungers 74 are mounted in bores in the bearing 69 and are pressed by the coil springs 75 against one face of the clutch member 67 to prevent overthrow or reverse movement of the latter. A knurled idler feed roll 76 is carried in the forked arm 77, which latter is secured to a shaft 78 mounted in a bearing in frame 3. Also secured to the shaft 78 is an arm 79 through an eye in the end of which freely passes a thumb screw 80 threaded into the frame of the machine. A coil spring 81 is disposed on the thumb screw 80 between the machine frame and the arm 79. Upper and lower strippers 82 and 83 are provided for the respective idler and driven rolls 76 and 70 to prevent sticking of the strip to the rolls. An extension 84 of the frame is provided with a guideway 85 for the strip, in which guideway is pivotally mounted a toothed dog 86 for preventing backward movement of the strip. Attached to the frame is an inclined flattened tubular strip guide 87, and adjacent the anvils 22 and 38 is an adjustable edge guide 88. Also disposed slightly in front of the guides 87 and 88 is an overhanging adjustable guide 89 which latter is resilient supported by the spring arms 90 (Figs. 1 and 4).

Mounted in the opening 4' in the table 4 and slightly in rear of the anvils 22 and 38 is a fixed shear blade 91 to which is pivotally connected a movable shear blade 92. The blade 92 is provided with a downwardly and horizontally extending actuating arm 94, and a coil spring 95 connected to the table 4 and the arm 94 tends normally to maintain the shear blade 92 in open position. Adjacent the end of the arm 94 it is provided with an eye or opening 96 and with a boss 97 in which is threadedly mounted a tripping screw 98 which may be secured in adjusted position by the lock nut 99. A link 100 is connected at one end to the treadle 13 and at its other end to a coil spring 101 extending downwardly from the work bed 4. The link 100 adjacent its upper end is provided with the notch 102, and a coil spring 103 secured to the link 100 and to the table 2 tends to draw the link laterally to the right, as shown in Figs. 2 and 5.

In operation, the strip which is to be adhesively united to the work is drawn through the feed rolls 70 and 76, under the dog 86, and through the tubular guide 87 to a position adjacent the work bed. The adhesive strip may be supported in a roll in any position convenient to the feed rolls 70 and 76, and it will be seen that by adjusting the thumb screw 80 the pressure of the idler feed roll on the driven roll may be varied to suit conditions. The operator then feeds the work piece, such as a cashmerette arctic upper, under the overhanging guide 89, and introduces the upper, with the binding strip superposed thereon, between the anvils 22 and 38, guiding the edges by means of the guide 88. The machine is then started, and in the movement of the cams 19 and 35 the anvils are pressed together to firmly unite a portion of the strip and work piece, the size of which portion is governed by the area of the bearing faces of the anvils. In the further movement of the machine the cam 53 acting on the rocker lever 34 tilts the same, and through the rock arms 32 and 29 and 50 and 47 actuates the yokes carrying the anvils to impart a translatory or feed movement to the anvils and to the work held between them simultaneously with the pressing together of the work-piece and strip. In the further movement of the cams 19, 35 and 53, the anvils are released or moved apart and also given a retrograde movement to bring them opposite the succeeding portion of the strip and work, and on the next movement of the anvils toward each other the succeeding portions of the strip and work are pressed together and then fed as before. In the rocking movement of lever 34, the link 65 acts on the one way clutch to drive the feed roll 70 and intermittently feed the strip to the work. By varying the position of slide block 62, the throw of link 65 may be changed to regulate the strip feed only as desired, and by varying the position of slide block 56 the pivot point of lever 34 may be changed to regulate both the translatory or feed movement of the anvils and also the strip feed. The overhanging guide 89 maintains the edge of the work piece, such as an arctic upper, flat against the table and prevents the edge from turning up, and it also acts to some extent as a stripper to prevent the work from sticking to either of the anvils 22 or 38. By reason of its resilient mounting it permits any thickened portion of the material, such as a seam, to readily pass beneath it. In the continued operation of the machine the operator guides the curved edge of the work piece past the edge guide 88 until the binding strip has been superposed on the desired portion and then releases the treadle 13 of the machine allowing the clutch and brake mechanism to stop the machine. In this movement the link 100 moves upwardly under the influence of spring 101 and as the upper edge of the notch 102 passes out of the eye 96 the spring 103 draws the link to one side until its upper end presses against the tripping screw 98 and hooks link 100 over extension 94. Upon the next downward movement of the treadle 13 the link 100, due to the engagement of the upper end of the notch 102 over the edge of the eye 96, draws down the extension 94 of the movable shear blade, thereby actuating the latter to cut the binding strip. At the same time it will be seen that as the arm 94 swings down and increases its angle with the link 100, the latter, due to its engagement by the tripping screw 98, is finally moved outward far enough for the shoulder at the upper end of notch 102 to slip off the upper surface of the extension 94, whereupon the spring 95 at once draws up the extension 94 and opens the shear blade. Hence it will be seen that each time the operator moves down the treadle 13 to start the machine the shear blade 92 is given a single actuation, but is at once released and is not again actuated until the machine has been stopped and is again started.

It is obvious that numerous changes may be made in the machine within the scope of the appended claims, and it is not limited in its use to the specific operation described but may be used wherever it is desired to adhesively join strips of sheeted material.

Having thus described my invention, what I claim and desire to protect by Letters Patent is:

1. A strip applying device comprising means for feeding the strip to the work, and means superficially engaging the material for simultaneously adhesively uniting a predetermined portion of the strip to the work and feeding the united material forward.

2. A strip applying device comprising means superficially engaging the material for adhesively uniting a predetermined portion of the strip to a work piece and for simultaneously feeding the united material, means for actuating said first means, and means connected to said actuating means for feeding the strip to the work independent of the feeding of the united work-piece and strip.

3. A strip applying device comprising means for feeding the strip to the work, means for simultaneously uniting a predetermined portion of the strip to the work by pressure and for feeding the united material forward, and means for varying the pressure.

4. A strip applying device comprising opposed means for uniting by pressure a predetermined portion of the strip to a work piece, means for actuating said first means, means for imparting a translatory movement to said first means, and means for varying the pressure and translatory movement.

5. A strip applying device comprising opposed means for uniting by pressure a predetermined portion of the strip to a work piece, means for actuating both said first means, means for imparting a translatory movement to said first means, a strip feeding device, and means for actuating the same.

6. A strip applying device comprising opposed means for uniting by pressure a predetermined portion of the strip to a work piece, means for actuating said first means, means for imparting a translatory movement to said first means, a strip feeding device, means for actuating the same, and means for varying its feed.

7. A strip applying device comprising opposed means for uniting by pressure a predetermined portion of the strip to a work piece, means for actuating said first means, means for imparting a translatory movement to said first means, a strip feeding device, means for actuating the same, and means for varying the pressure and translatory movement including means for varying the strip feed.

8. A strip applying device comprising opposed relatively adjustable means for uniting by pressure a predetermined portion of the strip to a work piece, cams for separately actuating said means, an additional cam, and means operated thereby for imparting a translatory movement to said first means.

9. A strip applying device comprising opposed relatively adjustable means for uniting by pressure a predetermined portion of the strip to a work piece, cams for separately actuating said means, an additional cam, means operated thereby for imparting a translatory movement to said first means, and means for varying said translatory movement.

10. A strip applying device comprising opposed means for uniting by pressure a predetermined portion of the strip to a work piece, cams for separately actuating said means, an additional cam, means operated thereby for imparting a translatory movement to said first means, a strip feeding device, and means connected to said last means for actuating said strip feeding device.

11. A strip applying device comprising coacting anvils for adhesively uniting the strip and work, means for actuating said anvils, said means including means for feeding the united strip and work, and additional means for feeding the strip.

12. A strip applying device comprising coacting relatively adjustable anvils for adhesively uniting the strip and a work piece, means for moving the anvils toward and from each other, means for imparting a work feeding movement to the anvils, and means operable from said last means for feeding the strip.

13. A strip applying device comprising spaced pivotally and slidably mounted yokes, coacting anvils carried by said yokes for adhesively uniting a strip and work piece, cams disposed within said yokes for moving them toward and from each other, a forked lever having a movable pivotal mounting, a cam operating in the fork thereof, actuating connections between said forked lever and yokes for imparting a sliding movement to the latter, and means for actuating said cams.

14. A strip applying device comprising spaced pivotally and slidably mounted yokes, coacting anvils carried by said yokes for adhesively uniting the strip and a work piece, cams disposed in said yokes for moving them toward and from each other, a three armed lever having a movable pivotal mounting in one arm, a fork on a second arm of said lever, a cam operating in said fork, strip feeding mechanism, an actuating connection between the latter and the third arm of said lever, actuating connections between said lever and yokes for imparting a sliding movement to the yokes, and means for actuating said cams.

15. A strip applying device comprising strip feeding mechanism, a pair of slidably and pivotally mounted yokes, coacting anvils carried by the yokes for adhesively uniting the strip and a work piece, cams engaging said yokes for imparting pivotal movement to said yokes, a third cam, means actuated thereby for imparting sliding movement to said yokes and operating said feed mechanism, and drive means for said cams.

16. A strip applying device comprising opposed anvils for uniting the strip and a workpiece by pressure, means for applying pressure thereto, a three armed rocking lever, means on one arm for adjustably and pivotally mounting the lever, actuating means connected to a second arm for rocking the lever, and connections between the third arm and said anvils for imparting a translatory movement to the latter.

17. A strip applying device comprising opposed anvils for uniting the strip and a workpiece by pressure, means for applying pressure thereto, a three armed rocking lever, means on one arm for adjustably and pivotally mounting the lever, actuating means connected to a second arm for rocking the lever, connections between the third arm and said anvils for imparting a translatory movement to the latter, a strip feeding device, and connections between said third arm and strip feeding device for actuating said device.

18. In a strip applying machine, means including opposed anvils for adhesively uniting the strip to a work piece, an inclined flattened tubular strip guide in advance thereof, an adjustable edge guide adjacent said anvils, and an adjustable resiliently supported overhanging work guide in advance of said strip guide.

19. In a strip applying machine, means for adhesively uniting a strip and work piece, drive means therefor, means for at will connecting said first two means, strip cutting means, and means for giving the latter a single actuation upon starting the machine.

20. In a strip applying machine, means for adhesively uniting a strip and work piece, drive means therefor, lever operated means for connecting or disconnecting said first two means, strip cutting means, and means connected to said lever operated means adapted to be connected to the strip cutting means in one movement of said lever operated means and to successively actuate the cutting means and be disconnected therefrom in another movement of the lever operated means.

21. In a strip applying machine, means for adhesively uniting a strip and work piece, a strip cutter, means for starting the machine and actuating said cutter including means for subsequently releasing the cutter from said starting means, and means for reconnecting the cutter to the starting means upon stopping the machine.

22. In a strip applying machine, means for adhesively uniting a strip and work piece, a treadle operated power transmitter therefor, a strip cutter, spring pressed means for connecting the strip cutter to the treadle of the power transmitter whereby the cutter may be actuated upon depression of the treadle, and means for releasing the strip cutter from said last means after actuation of the cutter.

Signed at New Haven, in the county of New Haven and State of Connecticut, this 6th day of February, 1922.

EUGENE E. CLEMENTS.